(12) United States Patent
Liu

(10) Patent No.: US 11,798,573 B2
(45) Date of Patent: Oct. 24, 2023

(54) METHOD FOR DENOISING VOICE DATA, DEVICE, AND STORAGE MEDIUM

(71) Applicant: Apollo Intelligent Connectivity (Beijing) Technology Co., Ltd., Beijing (CN)

(72) Inventor: Rong Liu, Beijing (CN)

(73) Assignee: APOLLO INTELLIGENT CONNECTIVITY (BEIJING) TECHNOLOGY CO., LTD., Beijing (CN)

( * ) Notice: Subject to any disclaimer, the term of this patent is extended or adjusted under 35 U.S.C. 154(b) by 31 days.

(21) Appl. No.: 17/824,623

(22) Filed: May 25, 2022

(65) Prior Publication Data

US 2022/0284914 A1 Sep. 8, 2022

(30) Foreign Application Priority Data

May 28, 2021 (CN) .......................... 202110589120.X

(51) Int. Cl.
*G10L 21/0232* (2013.01)
*G10L 13/02* (2013.01)
(Continued)

(52) U.S. Cl.
CPC .......... *G10L 21/0232* (2013.01); *G10L 13/02* (2013.01); *G10L 15/222* (2013.01); *G10L 21/028* (2013.01); *G10L 21/0208* (2013.01); *G10L 21/0272* (2013.01); *G10L 21/034* (2013.01); *G10L 21/0364* (2013.01); *G10L 2021/02087* (2013.01)

(58) Field of Classification Search
CPC ................. G10L 21/0208; G10L 21/02; G10L 2021/02087; G10L 21/0272; G10L 21/028; G10L 21/034; G10L 13/02
See application file for complete search history.

(56) References Cited

U.S. PATENT DOCUMENTS 9,947,333 B1 * 4/2018 David ................. G10L 21/0208
10,681,453 B1 * 6/2020 Meiyappan .............. H04R 1/08
(Continued)

FOREIGN PATENT DOCUMENTS

CN 105551498 A 5/2016
CN 106782591 A 5/2017
(Continued)

OTHER PUBLICATIONS

Chinese Office Action for Chinese Application 202110589120.X, dated Jul. 4, 2022, 8 pages.

*Primary Examiner* — Samuel G Neway
(74) *Attorney, Agent, or Firm* — Seed IP Law Group LLP

(57) ABSTRACT

The present disclosure provides a method for denoising voice data, an electronic device, and a computer readable storage medium. The present disclosure relates to the technical field of artificial intelligence, such as Internet of Vehicles, smart cockpit, smart voice, and voice recognition. A specific embodiment of the method includes: receiving an input to-be-played first piece of voice data; and invoking, in response to not detecting a synthetic voice interruption signal in a process of playing the first piece of voice data, a preset first denoising algorithm to filter out noise data except for the first piece of voice data.

20 Claims, 4 Drawing Sheets

(51) Int. Cl.
  *G10L 15/22*   (2006.01)
  *G10L 21/034*   (2013.01)
  *G10L 21/0364*   (2013.01)
  *G10L 21/0208*   (2013.01)
  *G10L 21/0272*   (2013.01)
  *G10L 21/028*   (2013.01)

(56) References Cited

U.S. PATENT DOCUMENTS

| | | | |
|---|---|---|---|
| 2002/0097884 A1* | 7/2002 | Cairns | G10K 11/17833 |
| | | | 381/86 |
| 2010/0161326 A1 | 6/2010 | Lee et al. | |
| 2016/0012813 A1* | 1/2016 | Every | G10L 25/78 |
| | | | 381/66 |
| 2018/0182392 A1* | 6/2018 | Li | H04R 1/406 |
| 2020/0372926 A1* | 11/2020 | Winton | G10L 21/0216 |
| 2022/0284914 A1* | 9/2022 | Liu | G10L 15/222 |
| 2022/0394403 A1* | 12/2022 | Liu | H04R 29/004 |

FOREIGN PATENT DOCUMENTS

| | | |
|---|---|---|
| CN | 110138463 A | 8/2019 |
| CN | 111768794 A | 10/2020 |
| CN | 112019967 A | 12/2020 |
| EP | 3 340 243 A1 | 6/2018 |
| EP | 3 716 271 A1 | 9/2020 |
| JP | 6-83387 A | 3/1994 |
| JP | 2018-92117 A | 8/2018 |
| JP | 2019-174665 A | 10/2019 |
| JP | 2020-98364 A | 6/2020 |
| JP | 2020-536273 A | 12/2020 |
| JP | 2021-83092 A | 5/2021 |
| KR | 20020030144 A | 4/2002 |
| WO | 2014/125860 A1 | 8/2014 |
| WO | 2019/133942 A1 | 7/2019 |

\* cited by examiner

METHOD FOR DENOISING VOICE DATA, DEVICE, AND STORAGE MEDIUM

CROSS-REFERENCE TO RELATED APPLICATION

The present application claims the priority of Chinese Patent Application No. 202110589120.X, titled "METHOD AND APPARATUS FOR DENOISING VOICE DATA, DEVICE, STORAGE MEDIUM, AND PROGRAM PRODUCT", filed on May 28, 2021, the content of which is incorporated herein by reference in its entirety.

TECHNICAL FIELD

The present disclosure relates to the technical field of data processing, specifically to the technical field of artificial intelligence such as Internet of Vehicles, smart cockpit, smart voice, and voice recognition, and more specifically to a method for denoising voice data, an electronic device, and a computer readable storage medium.

BACKGROUND

With the gradual popularization of electronic information technologies and intelligentization in vehicles, on-board terminals have more and more functions.

At present, an approach of additionally providing an on-board electronic device (such as a smart rearview mirror) with a smaller volume and less adaptation difficulty, to cooperate with an old on-board terminal is provided to jointly improve the user experience. That is, the smart rearview mirror can transmit data collected by itself, or to-be-displayed or to-be-played data, to the on-board terminal for display or playback.

SUMMARY

Embodiments of the present disclosure present a method for denoising voice data, an electronic device, and a computer readable storage medium.

In a first aspect, an embodiment of the present disclosure presents a method for denoising voice data, including: receiving an input to-be-played first piece of voice data; and invoking, in response to not detecting a synthetic voice interruption signal in a process of playing the first piece of voice data, a preset first denoising algorithm to filter out noise data except for the first piece of voice data.

In a second aspect, an embodiment of the present disclosure provides an electronic device, including: at least one processor; and a memory communicatively connected to the at least one processor; where the memory stores instructions executable by the at least one processor, and the instructions, when executed by the at least one processor, cause the at least one processor to execute the method for denoising voice data according to any one implementation in the first aspect.

In a third aspect, an embodiment of the present disclosure provides a non-transient computer readable storage medium storing computer instructions, where the computer instructions are used for causing a computer to execute the method for denoising voice data according to any one implementation in the first aspect.

It should be understood that contents described in the SUMMARY are neither intended to identify key or important features of embodiments of the present disclosure, nor intended to limit the scope of the present disclosure. Other features of the present disclosure will become readily understood in conjunction with the following description.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

Example embodiments of the present disclosure are described below with reference to the accompanying drawings, where various details of the embodiments of the present disclosure are included to facilitate understanding, and should be considered merely as examples. Therefore, those of ordinary skills in the art should realize that various changes and modifications can be made to the embodiments described here without departing from the scope and spirit of the present disclosure. Similarly, for clearness and conciseness, descriptions of well-known functions and structures are omitted in the following description. It should be noted that some embodiments in the present disclosure and some features in the embodiments may be combined with each other on a non-conflict basis.

In the technical solutions of the present disclosure, the acquisition, storage, and application of personal information of a user involved are in conformity with relevant laws and regulations, and do not violate public order and good customs because of adopting necessary security measures.

The method for denoising voice data provided in embodiments of the present disclosure includes: first receiving an input to-be-played first piece of voice data; and then invoking, in response to not detecting a synthetic voice interruption signal in a process of playing the first piece of voice data, a preset first denoising algorithm to filter out noise data except for the first piece of voice data. This method selects different denoising approaches based on whether a synthetic voice interruption signal is detected in a scenario where an on-board terminal receives and plays voice data input from other electronic devices. Especially, when the synthetic voice interruption signal is not detected, instead of normally using a denoising mode that highlights features of a to-be-input human voice as far as possible, a denoising mode that highlights original voice features of a first piece of voice data as far as possible is adopted, thereby maintaining the original voice of the first piece of voice data as far as possible in a scenario where no human voice appears, and at the same time, the data computing speed is faster in this denoising mode, thereby bringing a shorter time delay.

Figure 1:
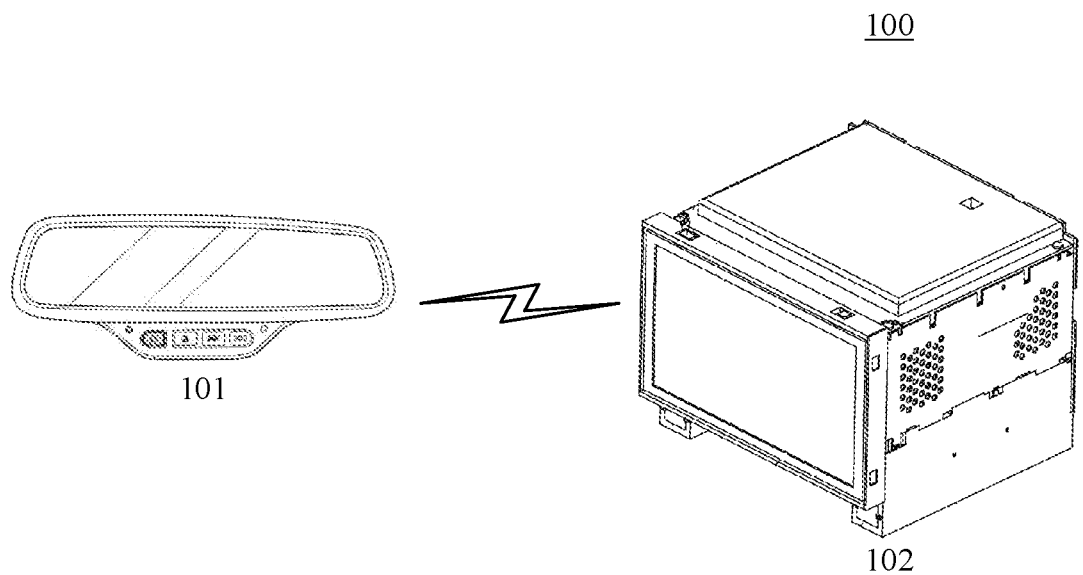
FIG. 1 is an example system architecture in which embodiments of the present disclosure may be implemented.

FIG. 1 shows an example system architecture 100 in which a method for denoising voice data, an apparatus for denoising voice data, an electronic device, and a computer readable storage medium of embodiments of the present disclosure may be implemented.

As shown in FIG. 1, the system architecture 100 may include a terminal device 101 (e.g., a smart rearview mirror in the figure) and an on-board terminal 102. The terminal device 101 may establish data communication with the on-board terminal 102 in various ways, such as wired communication via a USB data cable, or wireless communication such as WIFI, Bluetooth, or local area network.

A user may control the terminal device 101 to transmit data, such as voice or image data, collected by or stored in the terminal device 101 to the on-board terminal 102 for display, so as to make full use of functional hardware of the on-board terminal. Specifically, the above process may be implemented with the help of applications installed on the terminal device 101 and the on-board terminal 102, such as an audio collection application, an audio transmission application, or a denoising application.

The on-board terminal 102 may provide various services through various built-in applications. Taking a denoising application capable of providing a denoising service as an example, when running the denoising application, the on-board terminal 102 can achieve the following effects of: first receiving a first piece of voice data input from the terminal device 101 via a USB data cable; and then invoking, when a synthetic voice interruption signal is not detected in a process of playing the first piece of voice data, a preset first denoising algorithm to filter out noise data except for the first piece of voice data.

It should be understood that the numbers of the terminal device 101 and the on-board terminal in FIG. 1 are merely illustrative. Any number of terminal devices 101 and on-board terminals may be provided based on actual requirements.

Figure 2:
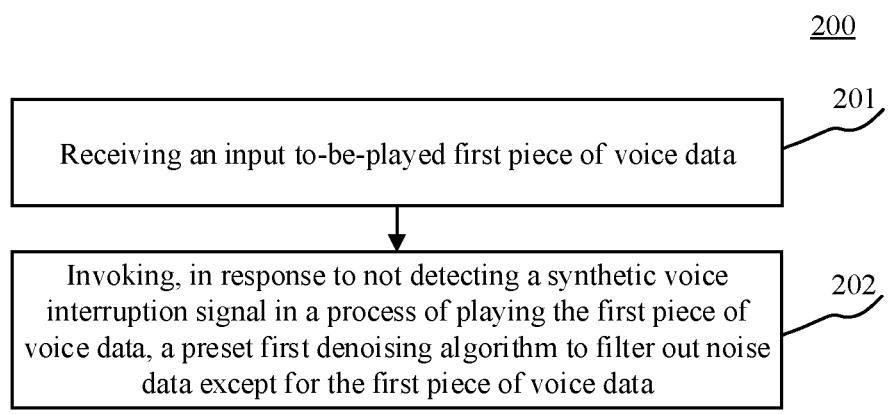
FIG. 2 is a flowchart of a method for denoising voice data according to an embodiment of the present disclosure.

Referring to FIG. 2, FIG. 2 is a flowchart of a method for denoising voice data provided in an embodiment of the present disclosure, where the process 200 includes the following steps:

Step 201: receiving an input to-be-played first piece of voice data.

This step is intended to receive the input to-be-played first piece of voice data by an executing body (e.g., the on-board terminal 102 shown in FIG. 1) of the method for denoising voice data.

The first piece of voice data may be an audio generated by an application running on a terminal device (e.g., the terminal device 101 shown in FIG. 1), or may be an acoustic signal appearing at a specific location or a surrounding location and being collected by the terminal device, or may be a read audio released or disclosed by other users. This is not specifically limited here. The terminal device may specifically be, e.g., a smart rearview mirror, a smart driving recorder, or a smart on-board player based on different representation forms of the terminal device, or may be other on-board devices having other functions and being capable of inputting voice data. This is not specifically limited here.

Step 202: invoking, in response to not detecting a synthetic voice interruption signal in a process of playing the first piece of voice data, a preset first denoising algorithm to filter out noise data except for the first piece of voice data.

On the basis of step 201, this step is established on the basis of the synthetic voice interruption signal being not detected in the process of playing the first piece of voice data, and is intended to invoke the preset first denoising algorithm by the executing body to filter out the noise data except for the first piece of voice data, i.e., original voice features in the first piece of voice data are highlighted as far as possible.

The invoking the first denoising algorithm may be implemented by switching a denoising mode of the executing body. For example, the first denoising algorithm is the only denoising algorithm in the preset first denoising mode, and the invoking first denoising algorithm may be implemented by switching a current denoising mode to the first denoising mode, such that the first denoising algorithm is in a working state in the first denoising mode.

It should be understood that highlighting the original voice features in the first piece of voice data as far as possible is actually equivalent to removing some interference noises in the vehicle, such as a wind noise, an engine noise, vibration, and a friction noise. The removal of such noises may be implemented by analysis, matching, and targeted filtering based on noise features. The removal way of such noises is relatively mature, and the amount of processed data is small, thereby minimizing the time delay.

The synthetic voice interruption signal is also known as a TTS interruption signal, in which TTS is the English abbreviation of the full English name "Text To Speech." A TTS voice refers to a machine voice, and the TTS interruption signal is actually equivalent to triggering a machine to generate a machine voice, i.e., the TTS interruption signal is a symbolic signal generated when a condition for causing the machine to generate or release the machine voice is satisfied. Since the TTS voice is mostly released by various voice assistants, detecting a synthetic voice interruption signal is usually equivalent to triggering a voice assistant.

The method for denoising voice data provided in the embodiment of the present disclosure selects different denoising approaches based on whether a synthetic voice interruption signal is detected in a scenario where an on-board terminal receives and plays voice data input from a smart on-board device. Especially, when the synthetic voice interruption signal is not detected, instead of normally using a denoising mode that highlights features of a to-be-input human voice as far as possible, a denoising mode that highlights original voice features of a first piece of voice data as far as possible is adopted, thereby maintaining the original voice of the first piece of voice data as far as possible in a scenario where no human voice appears, and at the same time, the data computing speed is faster in this denoising mode, thereby bringing a shorter time delay.

On the basis of the above embodiments, in response to detecting the synthetic voice interruption signal in the process of playing the first piece of voice data, a preset second denoising algorithm may be further invoked to filter out voice data except for human voice data from a second piece of voice data, where the second piece of voice data is generated based on the synthetic voice interruption signal, and is then input into the executing body. In combination with the above description of the specific representation of the synthetic voice interruption signal, the second piece of voice data may alternatively be considered as generally being a voice instruction subsequently sent by a user after the user triggers the voice assistant.

Different from the corresponding scenario of the synthetic voice interruption signal being not detected in step 202, this step is established on the basis of the synthetic voice interruption signal being detected in the process of playing the first piece of voice data, and is intended to invoke the preset second denoising algorithm by the executing body to filter out the voice data except for the human voice data from the second piece of voice data, i.e., the human voice data in the second piece of voice data is highlighted as far as possible.

The invoking the second denoising algorithm may be implemented by switching a denoising mode of the executing body. For example, the second denoising algorithm is the only denoising algorithm in the preset second denoising mode, and the invoking second denoising algorithm may be implemented by switching a current denoising mode to the second denoising mode, such that the second denoising algorithm is in a working state in the second denoising mode.

Different from the characteristics of the first denoising algorithm that highlights the original voice features in the first piece of voice data, the second denoising algorithm is intended to highlight the human voice data in the second piece of voice data as far as possible when the voice assistant is awakened, so as to improve the recognition accuracy rate of the information contained in the human voice. Therefore, the first piece of voice data will also be regarded as a noise in the second denoising algorithm.

This step provides another scenario different from the corresponding scenario of step 202, i.e., the two steps provide different processing approaches for different scenarios.

That is, in an embodiment that includes two different scenarios, the embodiment pre-configures two different denoising algorithms respectively based on whether the synthetic voice interruption signal is detected, so as to highlight the original voice features of the first piece of voice data as far as possible when the synthetic voice interruption signal is not detected, and highlight the human voice features in the second piece of voice data as far as possible when the synthetic voice interruption signal is detected, thereby denoising the voice data through an approach most satisfying the scenario requirements in different scenarios.

On the basis of any of the above embodiments, if a duration from last time the synthetic voice interruption signal was detected is more than a preset duration, the first denoising algorithm may be re-invoked to filter out the noise data except for the first piece of voice data. In combination with the second denoising mode provided in the above embodiment, it may also be simply understood as switching from the second denoising mode back to the first denoising mode. In addition, when a request for an incoming call is detected, the playback of the first piece of voice data may alternatively be paused, to guarantee the voice quality of the call to the utmost extent.

Figure 3:
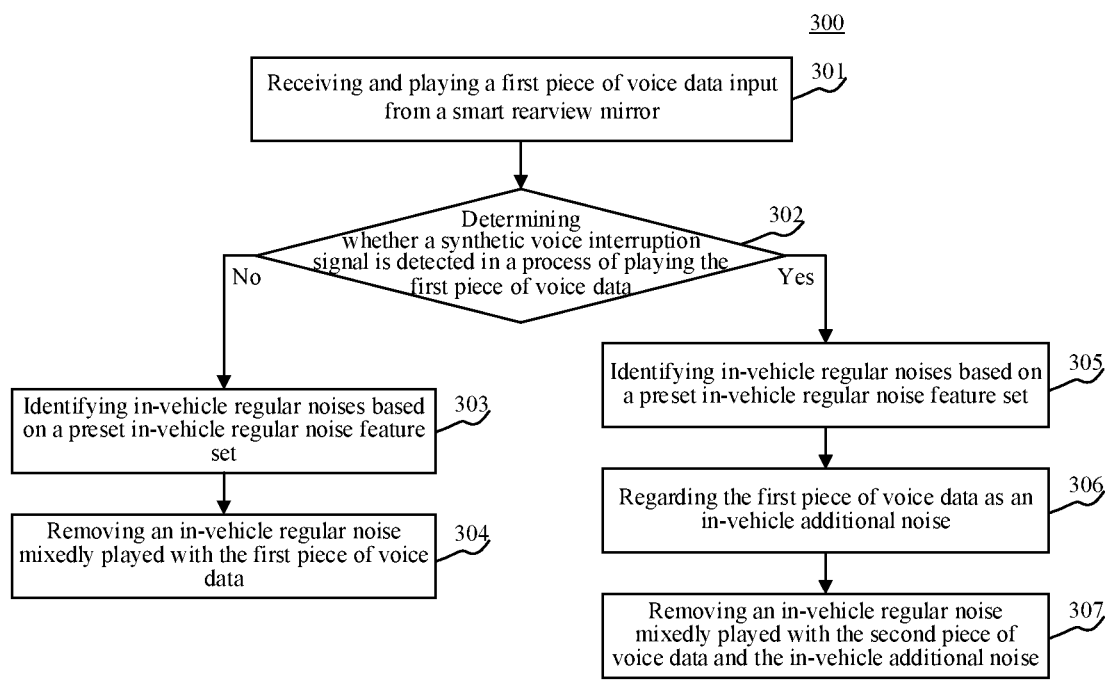
FIG. 3 is another flowchart of the method for denoising voice data according to an embodiment of the present disclosure.

Referring to FIG. 3, FIG. 3 is another flowchart of the method for denoising voice data provided in an embodiment of the present disclosure, where the process 300 includes the following steps:

Step 301: receiving and playing a first piece of voice data input by a smart rearview mirror.

The present embodiment introduces a specific implementation scheme by taking a smart rearview mirror as an example.

Step 302: determining whether a synthetic voice interruption signal is detected in a process of playing the first piece of voice data, executing step 303 if the synthetic voice interruption signal is not detected, and otherwise, executing step 305 if the synthetic voice interruption signal is detected.

Step 303: identifying in-vehicle regular noises based on a preset in-vehicle regular noise feature set.

The in-vehicle regular noise feature set includes: at least one of a wind noise feature, an engine noise feature, a vibration noise feature, or a friction noise feature. Of course, the in-vehicle regular noises may further include other types of noises that may appear within a vehicle.

Step 304: removing an in-vehicle regular noise mixedly played with the first piece of voice data.

Step 303 to step 304 provide a specific solution for targetedly removing the in-vehicle regular noise based on preset various types of noise features, which may specifically be implemented by directly determining a frequency band of the noise and performing filtering based on the frequency band. When the executing body has a computing capability satisfying time delay requirements, the solution may alternatively be implemented by a denoising model obtained by training, so as to obtain a better denoising effect.

Step 305: identifying in-vehicle regular noises based on a preset in-vehicle regular noise feature set.

Step 306: regarding the first piece of voice data as an in-vehicle additional noise.

Step 307: removing an in-vehicle regular noise mixedly played with the second piece of voice data and the in-vehicle additional noise.

In step 305 to step 307, not only is the same approach as step 303 used to determine the in-vehicle regular noises, but also the first piece of voice data is regarded as the in-vehicle additional noise in step 306, and then the in-vehicle regular noise mixedly played with the second piece of voice data and the in-vehicle additional noise are removed in step 307. Since the second piece of voice data is usually a voice instruction subsequently sent by a user after the user triggers a voice assistant, the vast majority of the second piece of voice data is human voice data, such that the denoising may merely be focused on removing other interference factors.

On the basis of the embodiment shown in the process 200, the present embodiment provides a more specific implementation through the process 300 shown in FIG. 3, determines a current scenario in step 302, specifically provides the processing approaches of step 303 to step 304 for the scenario where the synthetic voice interruption signal is not detected, to maintain the original voice features of the first piece of voice data as far as possible; and specifically provides the processing approaches of step 305 to step 307 for the scenario where the synthetic voice interruption signal is detected, to highlight human voice data in the second piece of voice data as far as possible.

On the basis of any of the above embodiments, in order to highlight the human voice data in the second piece of voice data as far as possible, a mixed acoustic signal composed of the first piece of voice data, the second piece of voice data, and the in-vehicle regular noises may alternatively be processed successively using an automatic gain control (AGC) technology and a nonlinear distortion technology, to highlight the human voice features as far as possible through gain processing of a certain part of audio with the aid of the AGC technology and distorting processing of the part of audio with the aid of the nonlinear distortion technology. In addition, since the nonlinear distortion technology is more sensitive to the audio data processed by the AGC technology, first processing by the AGC and then processing by the nonlinear distortion can achieve much better processing effects than separately using either of them.

A specific processing step includes:

first performing gain amplification on a human voice in a mixed acoustic signal using an automatic gain control technology to obtain voice data of a gain-amplified human voice; where the mixed acoustic signal is formed by mixing the first piece of voice data, the second piece of voice data, and the in-vehicle regular noises; and then distorting a non-human voice in the voice data of the gain-amplified human voice using a nonlinear distortion technology, to filter out voice data except for the human voice data from the second piece of voice data.

On the basis of any of the above embodiments, considering that the human voice data in the first piece of voice data may erroneously cause the executing body to generate the synthetic voice interruption signal, and may further control a trigger mechanism of the synthetic voice interruption signal to shield human voice data in the first piece of voice data; where the trigger mechanism includes an awakening mechanism of a voice assistant configured on an on-board terminal.

To deepen understanding, the present disclosure further provides a specific implementation scheme in combination with a specific application scenario:

The embodiment of the present disclosure divides all scenarios into a normal scenario and an interruption scenario, where:

the normal scenario: Even if an internal noise contains an interfering sound such as music, which may be easily distinguished and eliminated because it is sufficiently different from the human voice; and because most ambient noises are steady-state noises, the denoising is not difficult. Therefore, for the overall voice interaction effects, best effects can be already achieved by only adding a slight denoising process, and increasing the denoising degree will worsen the effects because the human voice is suppressed; and the interruption scenario: Because it is necessary to eliminate a TTS voice of an internal noise that is being broadcasted, and other human voices are very similar to the TTS voice, not only is a strong enough denoising degree required, but also special operations such as AGC and nonlinear distortion are required, so as to achieve desired effects.

In view of the characteristics of the normal scenario and the denoising requirement in this scenario, embodiments of the present disclosure pre-configure a denoising mode A with a low degree of suppression on human voices from other sources for this scenario; and in view of the characteristics of the interruption scenario and the denoising requirement in this scenario, the embodiments of the present disclosure pre-configure a denoising mode B with a high degree of suppression on the human voices from other sources for this scenario.

Figure 4:
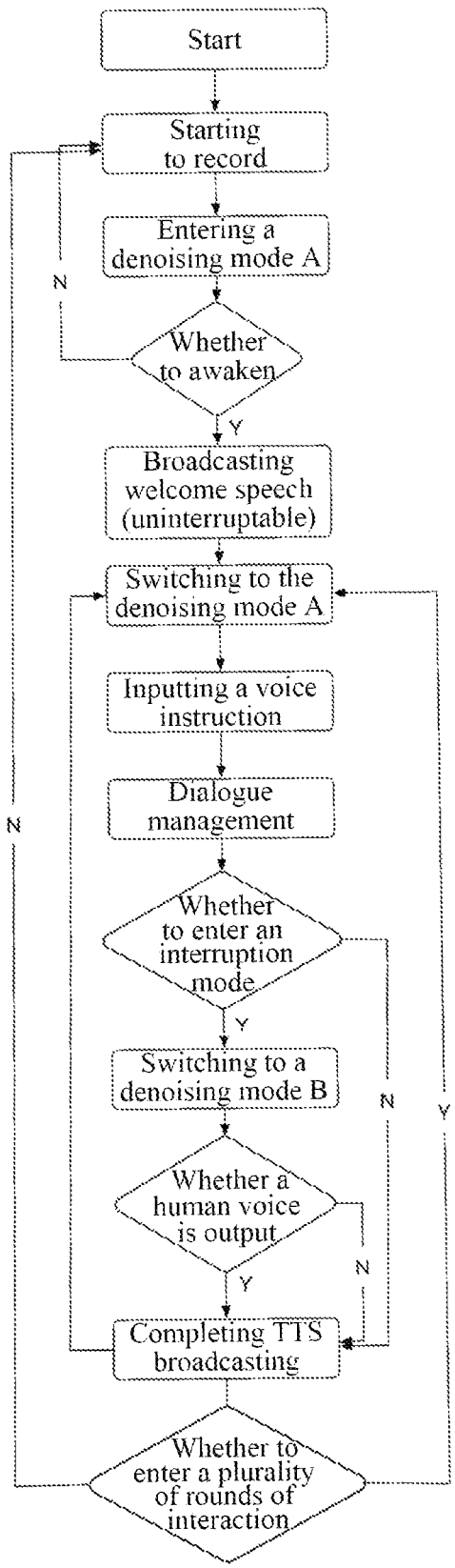
FIG. 4 is a schematic flowchart of a method for denoising voice data in an application scenario according to an embodiment of the present disclosure.

A schematic flowchart as shown in FIG. 4 may be referred to.

1) A voice assistant on an on-board terminal is initialized to enter a denoising mode A in a normal scenario;
2) A user awakens the voice assistant in a standby state manually or by voice, such that the voice assistant broadcasts welcome speech;
3) The user says a voice instruction that the user wants to execute;
4) The voice assistant recognizes the received voice instruction, and converts the voice instruction into a machine-recognizable semantic result via a dialogue managing module;
5) The voice assistant determines whether to enter an interruption mode based on the semantic result:
   a. If it is necessary to enter an interruption mode, the current denoising mode is switched to a denoising mode B, and recording of possible human voices is started in a process of broadcasting a TTS text corresponding to the user instruction;
   b. If it is not necessary to enter the interruption mode, the denoising mode remains unchanged;
6) The voice assistant broadcasts that the TTS voice is completed, and determines whether it is necessary to enter a plurality of rounds of interaction:
   a. If it is necessary to enter the plurality of rounds of interaction, the denoising mode restores to the denoising mode A, and recording of a possible instruction is continued; and
   b. If it is not necessary to enter the plurality of rounds of interaction, the denoising mode restores to the denoising mode A, and the voice interaction is completed, waiting for the next voice awakening by the user.

Hence, the above solutions provided in the embodiments of the present disclosure classify two greatly different types of noise environments by distinguishing different scenarios, so as to achieve more desired effects in both types of scenarios and obtain better overall effects. That is, in the normal scenario, the denoising mode A with a low denoising intensity is used to eliminate internal and external noises, whilst maintaining the human voice quality as far as possible; and in the interruption scenario, the denoising mode B capable of more effectively eliminating complex human-like noises is used to achieve better voice recognition effects.

Based on the division of the above two scenarios and the definition of the modes, the present disclosure minimizes the range of special processing to be additionally provided due to delay jitter, thereby guaranteeing the awakening rate and recognition rate in the normal scenario, and avoiding the occurrence of erroneously recording of TTS in the interruption scenario.

Figure 5:
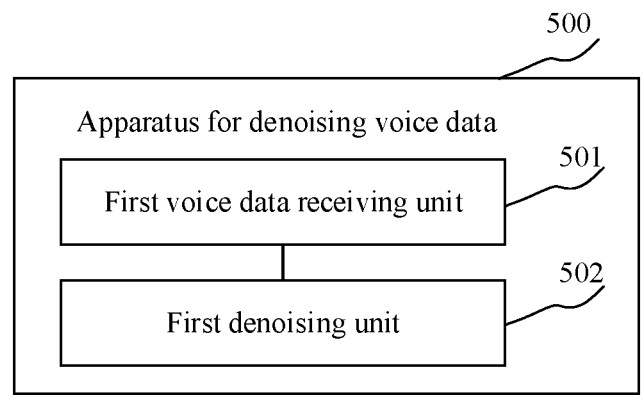
FIG. 5 is a structural block diagram of an apparatus for denoising voice data according to an embodiment of the present disclosure.

Further referring to FIG. 5, as an implementation of the method shown in the above figures, an embodiment of the present disclosure provides an apparatus for denoising voice data. The embodiment of the apparatus corresponds to the embodiment of the method shown in FIG. 2, and the apparatus may be specifically applied to various electronic devices.

As shown in FIG. 5, the apparatus 500 for denoising voice data in the present embodiment includes: a first voice data receiving unit 501 and a first denoising unit 502. The first voice data receiving unit 501 is configured to receive an input to-be-played first piece of voice data; and the first denoising unit 502 is configured to invoke, in response to not detecting a synthetic voice interruption signal in a process of playing the first piece of voice data, a preset first denoising algorithm to filter out noise data except for the first piece of voice data.

In the present embodiment, the specific processing of the first voice data receiving unit 501 and the first denoising unit 502 of the apparatus 500 for denoising voice data in the present embodiment and the technical effects thereof may be described with reference to the relevant description of step 201 and step 202 in the corresponding embodiment of FIG. 2, respectively, and are not repeated here.

In some alternative implementations of the present embodiment, the apparatus 500 for denoising voice data may further include:

a second denoising unit 503 configured to receive, in response to detecting the synthetic voice interruption signal being detected in the process of playing the first piece of voice data, an input second piece of voice data based on the synthetic voice interruption signal, and invoke a preset second denoising algorithm to filter out voice data except for human voice data from the second piece of voice data.

In some alternative implementations of the present embodiment, the first denoising unit may be further configured to:

identify in-vehicle regular noises based on a preset in-vehicle regular noise feature set; and remove an in-vehicle regular noise mixedly played with the first piece of voice data.

In some alternative implementations of the present embodiment, the second denoising unit may be further configured to:

identify in-vehicle regular noises based on a preset in-vehicle regular noise feature set; and regard the first piece of voice data as an in-vehicle additional noise; and remove an in-vehicle regular noise mixedly played with the second piece of voice data and the in-vehicle additional noise.

In some alternative implementations of the present embodiment, the second denoising unit may be further configured to:

perform gain amplification on a human voice in a mixed acoustic signal using an automatic gain control technology to obtain voice data of a gain-amplified human voice; where the mixed acoustic signal is formed by mixing the first piece of voice data, the second piece of voice data, and the in-vehicle regular noises; and distort a non-human voice in the voice data of the gain-amplified human voice using a nonlinear distortion technology, to filter out voice data except for the human voice data from the second piece of voice data.

In some alternative implementations of the present embodiment, the apparatus 500 for denoising voice data may further include:

an abnormal trigger item shielding unit configured to control a trigger mechanism of the synthetic voice interruption signal to shield human voice data in the first piece of voice data; where the trigger mechanism includes an awakening mechanism of a voice assistant configured on an on-board terminal.

In some alternative implementations of the present embodiment, the first piece of voice data is input from a smart rearview mirror, a smart driving recorder, or a smart on-board player.

In some alternative implementations of the present embodiment, the apparatus 500 for denoising voice data may further include:

a denoising algorithm switching unit configured to re-invoke, in response to a duration from last time the synthetic voice interruption signal was detected being more than a preset duration, the first denoising algorithm to filter out the noise data except for the first piece of voice data.

The present embodiment serves as an apparatus embodiment corresponding to the above method embodiment. The apparatus for denoising voice data provided in the present embodiment selects different denoising approaches based on whether a synthetic voice interruption signal is detected in a scenario where an on-board terminal receives and plays a first piece of voice data input from other electronic devices. Especially, when the synthetic voice interruption signal is not detected, instead of normally using a denoising mode that highlights features of a to-be-input human voice as far as possible, a denoising mode that highlights original voice features of the first piece of voice data as far as possible is adopted, thereby maintaining the original voice of the first piece of voice data as far as possible in a scenario where no human voice appears, and at the same time, the data computing speed is faster in this denoising mode, thereby bringing a shorter time delay.

According to an embodiment of the present disclosure, the present disclosure further provides an electronic device, including: at least one processor; and a memory communicatively connected to the at least one processor; where the memory stores instructions executable by the at least one processor, and the instructions are executed by the at least one processor, such that the at least one processor implements the method for denoising voice data according to any one of the above embodiments.

According to an embodiment of the present disclosure, the present disclosure further provides a readable storage medium storing computer instructions, where the computer instructions are used for causing a computer to implement the method for denoising voice data according to any one of the above embodiments.

An embodiment of the present disclosure provides a computer program product, where the computer program, when executed by a processor, implements the method for denoising voice data according to any one of the above embodiments.

Figure 6:
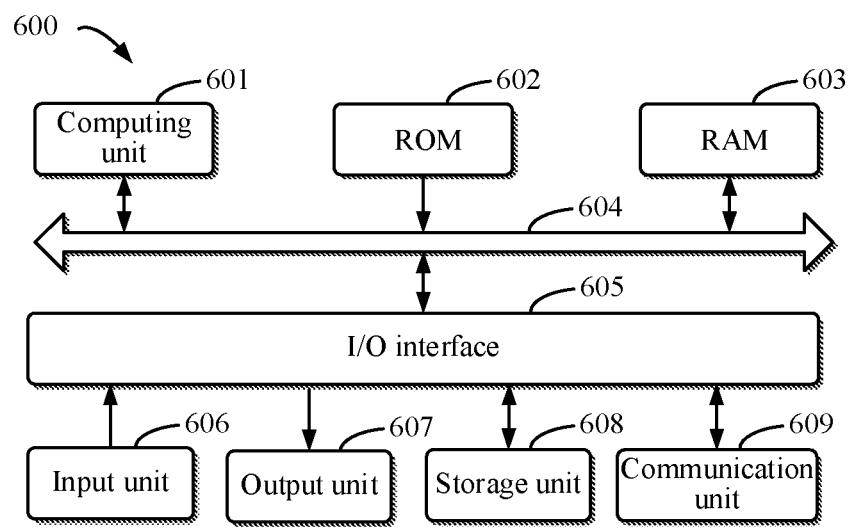
FIG. 6 is a schematic structural diagram of an electronic device adapted to executing the method for denoising voice data according to embodiments of the present disclosure.

FIG. 6 shows a schematic block diagram of an example electronic device 600 that may be configured to implement embodiments of the present disclosure. The electronic device is intended to represent various forms of digital computers, such as a laptop computer, a desktop computer, a workbench, a personal digital assistant, a server, a blade server, a mainframe computer, and other suitable computers. The electronic device may alternatively represent various forms of mobile apparatuses, such as a personal digital assistant, a cellular phone, a smart phone, a wearable device, and other similar computing apparatuses. The components shown herein, the connections and relationships thereof, and the functions thereof are used as examples only, and are not intended to limit implementations of the present disclosure described and/or claimed herein.

As shown in FIG. 6, the device 600 includes a computing unit 601, which may execute various appropriate actions and processes in accordance with a computer program stored in a read-only memory (ROM) 602 or a computer program loaded into a random access memory (RAM) 603 from a storage unit 608. The RAM 603 may further store various programs and data required by operations of the device 600. The computing unit 601, the ROM 602, and the RAM 603 are connected to each other through a bus 604. An input/output (I/O) interface 605 is also connected to the bus 604.

A plurality of components in the device 600 is connected to the I/O interface 605, including: an input unit 606, such as a keyboard and a mouse; an output unit 607, such as various types of displays and speakers; a storage unit 608, such as a magnetic disk and an optical disk; and a communication unit 609, such as a network card, a modem, and a wireless communication transceiver. The communication unit 609 allows the device 600 to exchange information/data with other devices through a computer network such as the Internet and/or various telecommunication networks.

The computing unit 601 may be various general purpose and/or special purpose processing components having a processing capability and a computing capability. Some examples of the computing unit 601 include, but are not limited to, a central processing unit (CPU), a graphics processing unit (GPU), various special purpose artificial intelligence (AI) computing chips, various computing units running a machine learning model algorithm, a digital signal processor (DSP), and any appropriate processor, controller, micro-controller, and the like. The computing unit 601 executes various methods and processes described above, such as the method for denoising voice data. For example, in some embodiments, the method for denoising voice data may be implemented as a computer software program that is tangibly included in a machine readable medium, such as the storage unit 608. In some embodiments, some or all of the computer programs may be loaded and/or installed onto the device 600 via the ROM 602 and/or the communication unit 609. When the computer program is loaded into the RAM 603 and executed by the computing unit 601, one or more steps of the method for denoising voice data described above may be executed. Alternatively, in other embodiments, the computing unit 601 may be configured to execute the method for denoising voice data by any other appropriate approach (e.g., by means of firmware).

Various implementations of the systems and technologies described above herein may be implemented in a digital electronic circuit system, an integrated circuit system, a field programmable gate array (FPGA), an application specific integrated circuit (ASIC), an application specific standard product (ASSP), a system on a chip (SOC), a complex programmable logic device (CPLD), computer hardware, firmware, software, and/or a combination thereof. The various implementations may include: being implemented in one or more computer programs, where the one or more computer programs may be executed and/or interpreted on a programmable system including at least one programmable processor, and the programmable processor may be a specific-purpose or general-purpose programmable processor, which may receive data and instructions from a storage system, at least one input apparatus and at least one output apparatus, and send the data and instructions to the storage system, the at least one input apparatus and the at least one output apparatus.

Program codes for implementing the method of the present disclosure may be compiled using any combination of one or more programming languages. The program codes may be provided to a processor or controller of a general purpose computer, a special purpose computer, or other programmable apparatuses for data processing, such that the program codes, when executed by the processor or controller, cause the functions/operations specified in the flowcharts and/or block diagrams to be implemented. The program codes may be completely executed on a machine, partially executed on a machine, partially executed on a machine and partially executed on a remote machine as a separate software package, or completely executed on a remote machine or server.

In the context of the present disclosure, the machine readable medium may be a tangible medium which may contain or store a program for use by, or used in combination with, an instruction execution system, apparatus or device. The machine readable medium may be a machine readable signal medium or a machine readable storage medium. The computer readable medium may include, but is not limited to, electronic, magnetic, optical, electromagnetic, infrared, or semiconductor systems, apparatuses, or devices, or any appropriate combination of the above. A more specific example of the machine readable storage medium will include an electrical connection based on one or more pieces of wire, a portable computer disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device, or any appropriate combination of the above.

To provide interaction with a user, the systems and technologies described herein may be implemented on a computer that is provided with: a display apparatus (e.g., a CRT (cathode ray tube) or a LCD (liquid crystal display) monitor) configured to display information to the user; and a keyboard and a pointing apparatus (e.g., a mouse or a trackball) by which the user can provide an input to the computer. Other kinds of apparatuses may also be configured to provide interaction with the user. For example, feedback provided to the user may be any form of sensory feedback (e.g., visual feedback, auditory feedback, or tactile feedback); and an input may be received from the user in any form (including an acoustic input, a voice input, or a tactile input).

The systems and technologies described herein may be implemented in a computing system that includes a back-end component (e.g., as a data server), or a computing system that includes a middleware component (e.g., an application server), or a computing system that includes a front-end component (e.g., a user computer with a graphical user interface or a web browser through which the user can interact with an implementation of the systems and technologies described herein), or a computing system that includes any combination of such a back-end component, such a middleware component, or such a front-end component. The components of the system may be interconnected by digital data communication (e.g., a communication network) in any form or medium. Examples of the communication network include: a local area network (LAN), a wide area network (WAN), and the Internet.

The computer system may include a client and a server. The client and the server are generally remote from each other, and generally interact with each other through a communication network. The relationship between the client and the server is generated by virtue of computer programs that run on corresponding computers and have a client-server relationship with each other. The server may be a cloud server, which is also known as a cloud computing server or a cloud host, and is a host product in a cloud computing service system to solve the defects of difficult management and weak service extendibility existing in conventional physical hosts and virtual private servers (VPS).

The technical solutions according to embodiments of the present disclosure select different denoising approaches based on whether a synthetic voice interruption signal is detected in a scenario where an on-board terminal receives and plays voice data input from a smart on-board device. Especially, when the synthetic voice interruption signal is not detected, instead of normally using a denoising mode that highlights features of a to-be-input human voice as far as possible, a denoising mode that highlights original voice features of a first piece of voice data as far as possible is adopted, thereby maintaining the original voice of the first piece of voice data as far as possible in a scenario where no human voice appears, and at the same time, the data computing speed is faster in this denoising mode, thereby bringing a shorter time delay.

It should be understood that the various forms of processes shown above may be used to reorder, add, or delete steps. For example, the steps disclosed in the present disclosure may be executed in parallel, sequentially, or in different orders, as long as the desired results of the technical solutions disclosed in the present disclosure can be implemented. This is not limited herein.

The above specific implementations do not constitute any limitation to the scope of protection of the present disclosure.

It should be understood by those skilled in the art that various modifications, combinations, sub-combinations, and replacements may be made according to the design requirements and other factors. Any modification, equivalent replacement, improvement, and the like made within the spirit and principle of the present disclosure should be encompassed within the scope of protection of the present disclosure.

What is claimed is:

1. A method for denoising voice data, comprising:
   receiving an input to-be-played first piece of voice data; and
   invoking, in response to not detecting a synthetic voice interruption signal in a process of playing the first piece of voice data, a preset first denoising algorithm to filter out noise data except for the first piece of voice data.

2. The method according to claim 1, wherein the method further comprises:
   receiving, in response to detecting the synthetic voice interruption signal in the process of playing the first piece of voice data, an input second piece of voice data based on the synthetic voice interruption signal, and invoking a preset second denoising algorithm to filter out voice data except for human voice data from the second piece of voice data.

3. The method according to claim 1, wherein the invoking the preset first denoising algorithm to filter out the noise data except for the first piece of voice data comprises:
   identifying in-vehicle regular noises based on a preset in-vehicle regular noise feature set; and
   removing an in-vehicle regular noise mixedly played with the first piece of voice data.

4. The method according to claim 2, wherein the invoking the preset second denoising algorithm to filter out the voice data except for the human voice data in the second piece of voice data comprises:
   identifying in-vehicle regular noises based on a preset in-vehicle regular noise feature set;
   regarding the first piece of voice data as an in-vehicle additional noise; and
   removing an in-vehicle regular noise mixedly played with the second piece of voice data and the in-vehicle additional noise.

5. The method according to claim 2, wherein the invoking the preset second denoising algorithm to filter out the voice data except for the human voice data among the second piece of voice data comprises:
   performing gain amplification on a human voice in a mixed acoustic signal using an automatic gain control technology to obtain voice data of a gain-amplified human voice; wherein the mixed acoustic signal is formed by mixing the first piece of voice data, the second piece of voice data, and in-vehicle regular noises; and
   distorting a non-human voice in the voice data of the gain-amplified human voice using a nonlinear distortion technology, to filter out the voice data except for the human voice data from the second piece of voice data.

6. The method according to claim 1, wherein the method further comprises:
   controlling a trigger mechanism of the synthetic voice interruption signal to shield human voice data in the first piece of voice data; wherein the trigger mechanism comprises a preset awakening mechanism configured for a voice assistant.

7. The method according to claim 1, wherein the first piece of voice data is input from a smart rearview mirror, a smart driving recorder, or a smart on-board player.

8. The method according to claim 1, wherein the method further comprises:
   re-invoking, in response to a duration from last time the synthetic voice interruption signal was detected being more than a preset duration, the first denoising algorithm to filter out the noise data except for the first piece of voice data.

9. The method according to claim 2, wherein the method further comprises:
   re-invoking, in response to a duration from last time the synthetic voice interruption signal was detected being more than a preset duration, the first denoising algorithm to filter out the noise data except for the first piece of voice data.

10. The method according to claim 3, wherein the method further comprises:
    re-invoking, in response to a duration from last time the synthetic voice interruption signal was detected being more than a preset duration, the first denoising algorithm to filter out the noise data except for the first piece of voice data.

11. The method according to claim 4, wherein the method further comprises:
    re-invoking, in response to a duration from last time the synthetic voice interruption signal was detected being more than a preset duration, the first denoising algorithm to filter out the noise data except for the first piece of voice data.

12. An electronic device, comprising:
    at least one processor; and
    a memory communicatively connected to the at least one processor; wherein
    the memory stores instructions executable by the at least one processor, and the instructions, when executed by the at least one processor, cause the at least one processor to perform operations comprising:
    receiving an input to-be-played first piece of voice data; and
    invoking, in response to not detecting a synthetic voice interruption signal in a process of playing the first piece of voice data, a preset first denoising algorithm to filter out noise data except for the first piece of voice data.

13. The electronic device according to claim 12, wherein the operations further comprise:
    receiving, in response to detecting the synthetic voice interruption signal in the process of playing the first piece of voice data, an input second piece of voice data based on the synthetic voice interruption signal, and invoking a preset second denoising algorithm to filter out voice data except for human voice data from the second piece of voice data.

14. The electronic device according to claim 12, wherein the invoking the preset first denoising algorithm to filter out the noise data except for the first piece of voice data comprises:
    identifying in-vehicle regular noises based on a preset in-vehicle regular noise feature set; and
    removing an in-vehicle regular noise mixedly played with the first piece of voice data.

15. The electronic device according to claim 13, wherein the invoking the preset second denoising algorithm to filter out the voice data except for the human voice data in the second piece of voice data comprises:
- identifying in-vehicle regular noises based on a preset in-vehicle regular noise feature set;
- regarding the first piece of voice data as an in-vehicle additional noise; and
- removing an in-vehicle regular noise mixedly played with the second piece of voice data and the in-vehicle additional noise.

16. The electronic device according to claim 13, wherein the invoking the preset second denoising algorithm to filter out the voice data except for the human voice data among the second piece of voice data comprises:
- performing gain amplification on a human voice in a mixed acoustic signal using an automatic gain control technology to obtain voice data of a gain-amplified human voice; wherein the mixed acoustic signal is formed by mixing the first piece of voice data, the second piece of voice data, and in-vehicle regular noises; and
- distorting a non-human voice in the voice data of the gain-amplified human voice using a nonlinear distortion technology, to filter out the voice data except for the human voice data from the second piece of voice data.

17. The electronic device according to claim 12, wherein the operations further comprise:
- controlling a trigger mechanism of the synthetic voice interruption signal to shield human voice data in the first piece of voice data; wherein the trigger mechanism comprises a preset awakening mechanism configured for a voice assistant.

18. The electronic device according to claim 12, wherein the first piece of voice data is input from a smart rearview mirror, a smart driving recorder, or a smart on-board player.

19. The electronic device according to claim 12, wherein the operations further comprise:
- re-invoking, in response to a duration from last time the synthetic voice interruption signal was detected being more than a preset duration, the first denoising algorithm to filter out the noise data except for the first piece of voice data.

20. A non-transient computer readable storage medium storing computer instructions, wherein the computer instructions are used for causing a computer to perform operations comprising:
- receiving an input to-be-played first piece of voice data; and
- invoking, in response to not detecting a synthetic voice interruption signal in a process of playing the first piece of voice data, a preset first denoising algorithm to filter out noise data except for the first piece of voice data.

* * * * *